(12) United States Patent
Chang et al.

(10) Patent No.: US 12,543,289 B2
(45) Date of Patent: Feb. 3, 2026

(54) HEAT DISSIPATION ASSEMBLY AND ELECTRONIC DEVICE

(71) Applicants: MICRO-STAR INT'L CO., LTD., New Taipei (TW); MSI ELECTRONIC (KUN SHAN) CO., LTD., Kunshan (CN)

(72) Inventors: Chia-Ming Chang, Taipei (TW); Ching-Chi Wu, Taipei (TW)

(73) Assignees: MICRO-STAR INT'L CO., LTD., New Taipei (TW); MSI ELECTRONIC (KUN SHAN) CO., LTD., Kunshan (CN)

( * ) Notice: Subject to any disclaimer, the term of this patent is extended or adjusted under 35 U.S.C. 154(b) by 143 days.

(21) Appl. No.: 18/399,682

(22) Filed: Dec. 28, 2023

(65) Prior Publication Data
US 2025/0133688 A1    Apr. 24, 2025

(30) Foreign Application Priority Data
Oct. 18, 2023 (TW) ................................ 112139721

(51) Int. Cl.
*H05K 7/20* (2006.01)
*G06F 1/20* (2006.01)

(52) U.S. Cl.
CPC ......... *H05K 7/20145* (2013.01); *G06F 1/203* (2013.01); *H05K 7/20172* (2013.01); *H05K 7/2039* (2013.01)

(58) Field of Classification Search
CPC ...... G06F 1/203; G06F 1/20; G06F 2200/201; G06F 1/185; G06F 1/206; H05K 7/20145; H05K 7/20172; H05K 7/20154; H05K 7/20409; H05K 7/20136; H05K 7/2039; H05K 5/0217; H05K 7/20163; H05K 7/20718; H01L 23/467; F04D 25/166; F04D 29/281; F04D 29/30
See application file for complete search history.

(56) References Cited

U.S. PATENT DOCUMENTS

| | | | |
|---|---|---|---|
| 10,969,838 B2 * | 4/2021 | He | G06F 1/203 |
| 11,930,620 B2 * | 3/2024 | Ku | G06F 1/203 |
| 2005/0252642 A1 * | 11/2005 | Chang | H01L 23/3672 |
| | | | 257/E23.099 |
| 2020/0081505 A1 * | 3/2020 | Ma | G06F 1/203 |
| 2021/0219457 A1 * | 7/2021 | Wong | H05K 7/20145 |
| 2022/0217870 A1 * | 7/2022 | Columbus | H05K 7/1092 |
| 2023/0189471 A1 * | 6/2023 | Hashiba | H05K 7/20154 |
| | | | 361/690 |
| 2023/0328930 A1 * | 10/2023 | Lin | G06F 1/20 |
| | | | 361/697 |
| 2023/0337406 A1 * | 10/2023 | Bawa | H01L 23/467 |

* cited by examiner

*Primary Examiner* — Michael A Matey
(74) *Attorney, Agent, or Firm* — Maschoff Brennan

(57) ABSTRACT

This disclosure provides a heat dissipation assembly and an electronic device. The heat dissipation assembly includes a first fan, a first fin assembly, a second fan, a second fin assembly, a vapor chamber and a heat dissipation sheet. The second fan has a second inlet, at least one second outlet and a side outlet. The at least one second outlet and the side outlet are in fluid communication with the second inlet. A direction of the side outlet directs toward the first fan. The vapor chamber is thermally coupled to the first fin assembly and the second fin assembly. The heat dissipation sheet is in thermal contact with a side of the vapor chamber, and located between the first fan and the second fan.

6 Claims, 5 Drawing Sheets

HEAT DISSIPATION ASSEMBLY AND ELECTRONIC DEVICE

CROSS-REFERENCE TO RELATED APPLICATIONS

This non-provisional application claims priority under 35 U.S.C. § 119(a) on Patent Application No(s). 112139721 filed in Taiwan, R.O.C. on Oct. 18, 2023, the entire contents of which are hereby incorporated by reference.

TECHNICAL FIELD

The disclosure relates to a heat dissipation assembly and an electronic device, more particularly to a heat dissipation assembly including at least one fan and an electronic device including the same.

BACKGROUND

Vapor chamber has been widely used for heat flux transformation due to the ability to transfer heat in two dimensions by being in a planar shape. For example, in order to enhance the efficiency for cooling a heat source such as a central processing unit (CPU) or graphic processing unit (GPU), some types of laptop computers include one or more vapor chambers therein to transfer the heat generated by the heat source in a fast and uniform manner.

However, in conventional laptop computers, the cold air blown by the fan is unable to be effectively transferred to the vapor chamber, such that the heat source is unable to be effectively cooled by the vapor chamber. Also, if additional vents are added on the housing for helping such cold air to be transferred to the vapor chamber, there will be less I/O openings on the housing. That is, conventional laptop computers are unable to effectively cool the heat source by the vapor chamber without reducing the amount of the available I/O openings.

SUMMARY

The disclosure provides a heat dissipation assembly and an electronic device to effectively cool the heat source by the vapor chamber without reducing the amount of the available I/O openings.

One embodiment of this disclosure provides a heat dissipation assembly including a first fan, at least one first fin assembly, a second fan, at least one second fin assembly, a vapor chamber and a heat dissipation sheet. The first fan has a first inlet and at least one first outlet. The first inlet and the at least one first outlet are in fluid communication with each other, and are located on different sides of the first fan, respectively. The at least one first fin assembly is disposed adjacent to the at least one first outlet. The second fan has a second inlet, at least one second outlet and a side outlet. The at least one second outlet and the side outlet are in fluid communication with the second inlet. The second inlet, the at least one second outlet and the side outlet are located on different sides of the second fan, respectively. A direction of the side outlet directs toward the first fan. The at least one second fin assembly is disposed adjacent to the at least one second outlet. The vapor chamber is thermally coupled to the at least one first fin assembly and the at least one second fin assembly. The heat dissipation sheet is in thermal contact with a side of the vapor chamber, and located between the first fan and the second fan.

Another embodiment of this disclosure provides an electronic device including a housing, a motherboard, at least one heat source and a heat dissipation assembly. The motherboard is disposed in the housing. The at least one heat source is disposed on the motherboard. The heat dissipation assembly is disposed in the housing and includes a first fan, at least one first fin assembly, a second fan, at least one second fin assembly, a vapor chamber and a heat dissipation sheet. The first fan has a first inlet and at least one first outlet. The first inlet and the at least one first outlet are in fluid communication with each other, and are located on different sides of the first fan, respectively. The at least one first fin assembly is disposed adjacent to the at least one first outlet. The second fan has a second inlet, at least one second outlet and a side outlet. The at least one second outlet and the side outlet are in fluid communication with the second inlet. The second inlet, the at least one second outlet and the side outlet are located on different sides of the second fan, respectively. A direction of the side outlet directs toward the first fan. The at least one second fin assembly is disposed adjacent to the at least one second outlet. The vapor chamber is thermally coupled to the at least one first fin assembly, the at least one second fin assembly and the at least one heat source. The heat dissipation sheet is in thermal contact with a side of the vapor chamber that is located farthest away from the at least one heat source, and located between the first fan and the second fan.

According to the heat dissipation assembly and the electronic device disclosed by the above embodiments, the direction of the side outlet directs toward the first fan. Thus, the cold air blown by the second fan is effectively guided to the vapor chamber via the side outlet. In this way, even though there is no opening or hole on the housing for accommodating the heat dissipation assembly, the cold air is still allowed to be effectively guided to the vapor chamber. Accordingly, the heat dissipation assembly according to the disclosure is able to effectively cool the heat source by the vapor chamber without reducing the amount of the available I/O openings.

In addition, since the amount of the available I/O openings on the housing for accommodating the heat dissipation assembly is not reduced, the design freedom of the I/O openings is increased, thereby reducing the overall manufacturing cost of the electronic device including the heat dissipation assembly.

Moreover, since the heat dissipation assembly according to the disclosure effectively cools the heat source by the vapor chamber, the two fans (i.e., the first fan and the second fan) included in the heat dissipation assembly are able to effectively cool the heat sources. In this way, the heat dissipation assembly is not required to include more than two fans, thereby facilitating the maintenance of the heat dissipation assembly.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
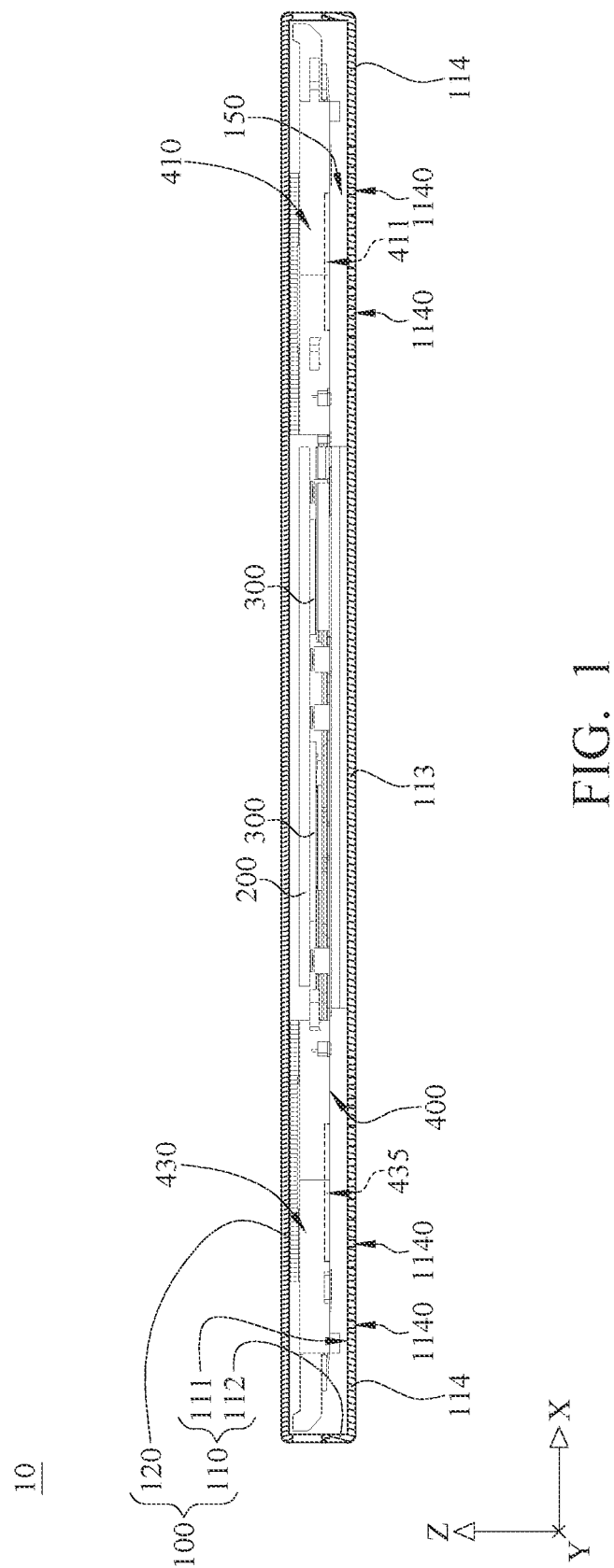
FIG. 1 is a side cross-sectional view of an electronic device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1. FIG. 1 is a side cross-sectional view of an electronic device 10 according to an embodiment of the disclosure. In this embodiment, the electronic device 10 is, for example, a host of a laptop computer (not shown). The electronic device 10 includes a housing 100, a motherboard 200, two heat sources 300 and a heat dissipation assembly 400. There may be a display (not shown) pivotally connected to the electronic device 10. In this embodiment, the housing 100 includes a base 110 and a cover plate 120. The base 110 is, for example, the so-called "D cover" or "D shell". The base 110 includes a bottom plate 111 and a side plate 112. The side plate 112 stands on the bottom plate 111. The cover plate 120 is, for example, the so-called "C cover" or "C shell". The cover plate 120 is stacked on a side of the side plate 112 that is located farthest away from the bottom plate 111. The bottom plate 111, the side plate 112 and the cover plate 120 together form an accommodation space 150.

In this embodiment, the bottom plate 111 includes a covering part 113 and two opening parts 114. The two opening parts 114 are connected to two opposite sides of the covering part 113, respectively. The two opening parts 114 each have a plurality of outer inlets 1140. The covering part 113 covers the accommodation space 150. That is, the covering part 113 is a part of the bottom plate 111 that does not have any opening or hole.

The motherboard 200 is disposed in the accommodation space 150 of the housing 100. The two heat sources 300 are, for example, central processing units (CPUs) or graphic processing units (GPUs). The heat sources 300 are disposed on and electrically connected to the motherboard 200. Note that in other embodiments, the electronic device may merely include one heat source.

Figure 2:
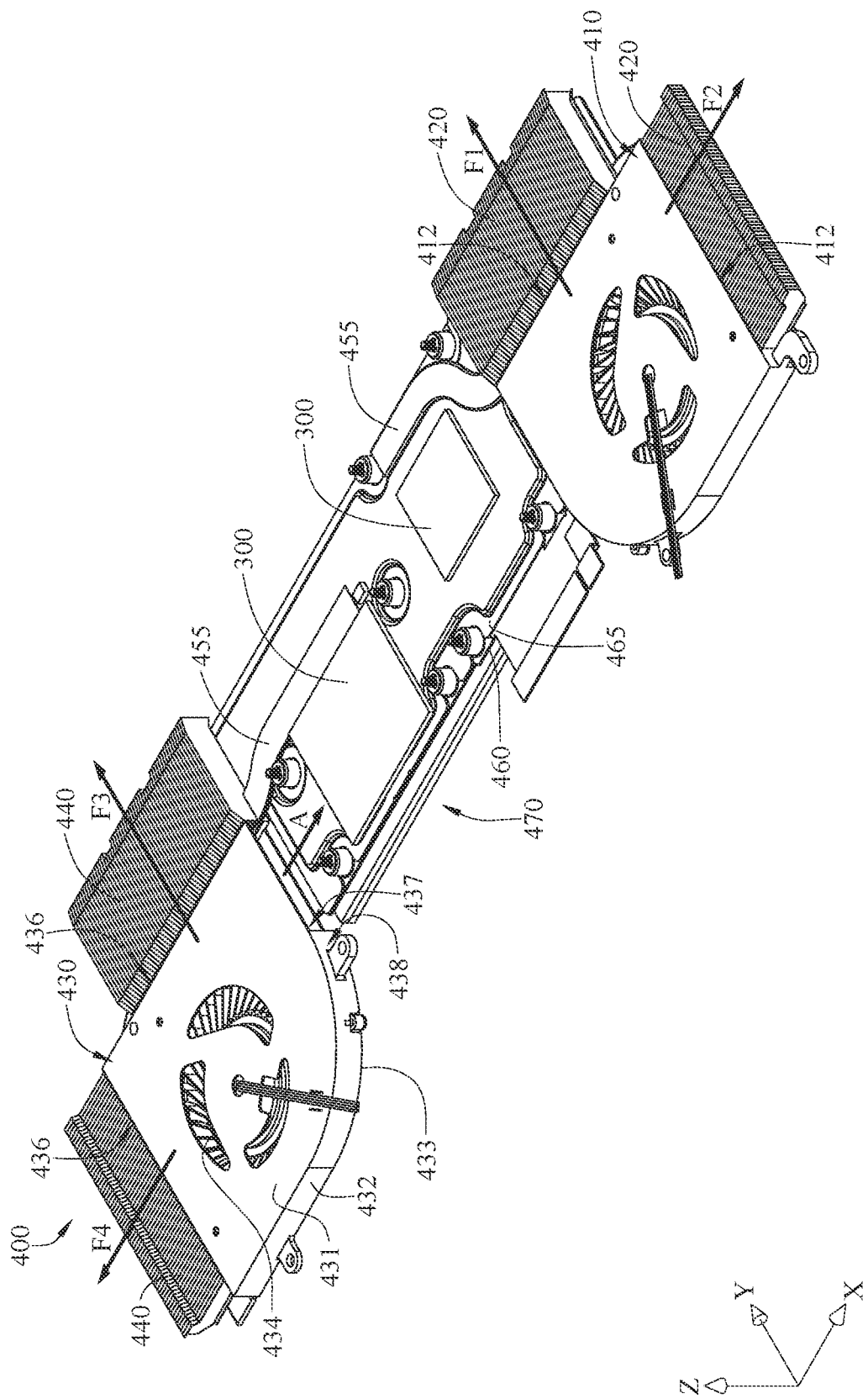
FIG. 2 is a perspective view of heat sources and a heat dissipation assembly of the electronic device in FIG. 1.
Figure 3:
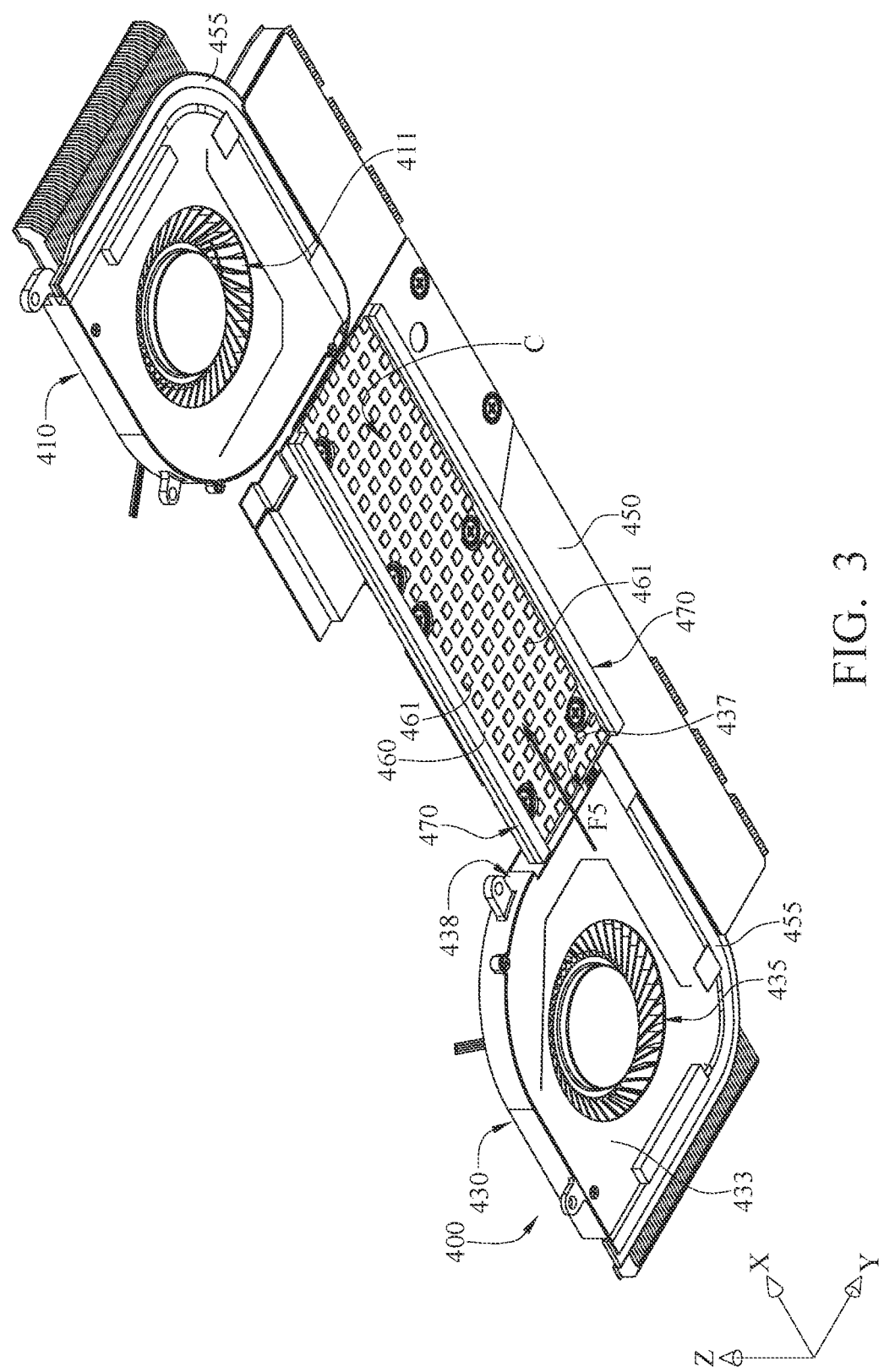
FIG. 3 is a perspective view of the heat dissipation assembly in FIG. 2 from another viewing angle.
Figure 4:
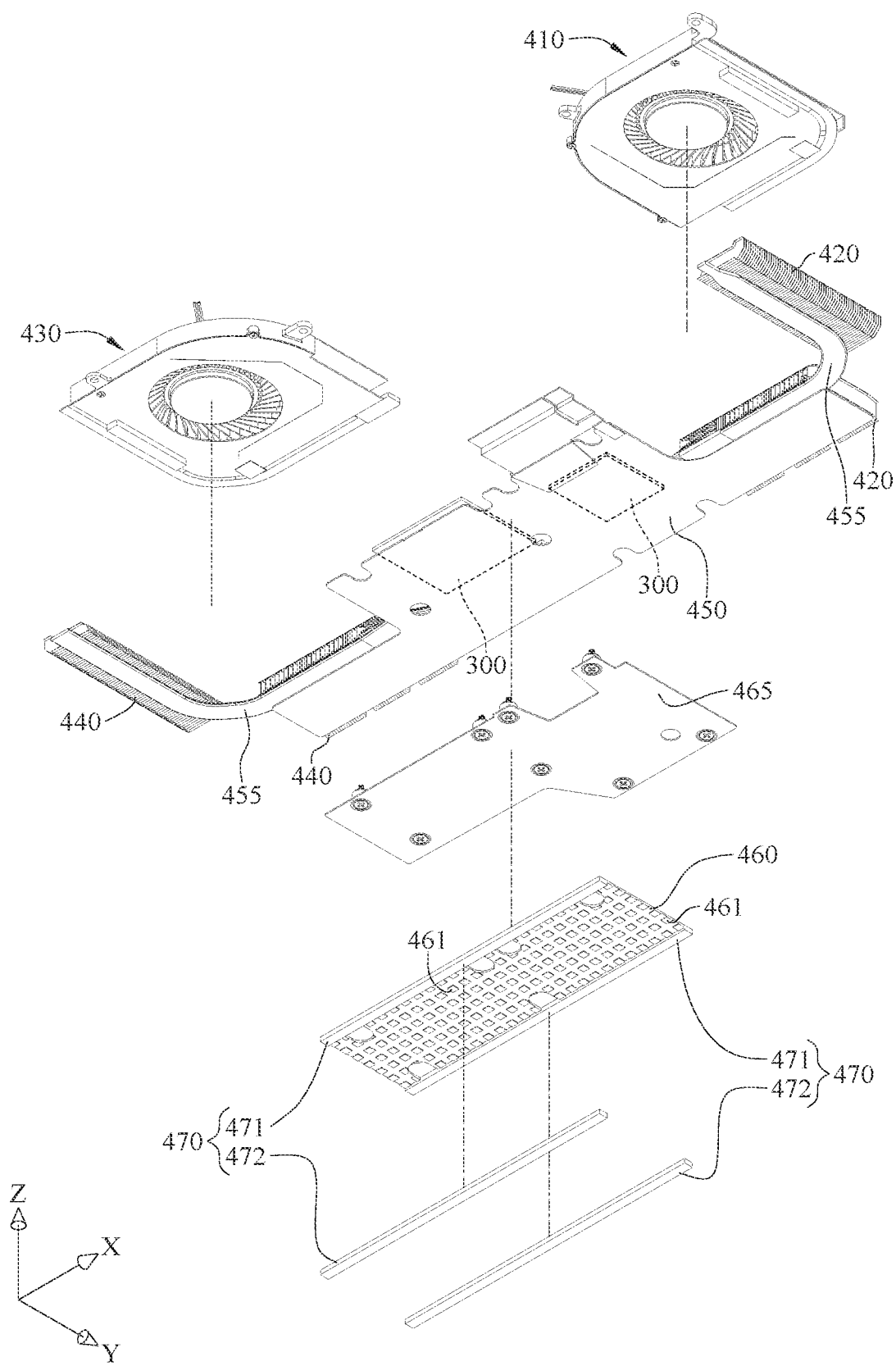
FIG. 4 is an explode view of the heat sources and the heat dissipation assembly in FIG. 3.

Please refer to FIGS. 2 to 4. FIG. 2 is a perspective view of the heat sources 300 and the heat dissipation assembly 400 of the electronic device 10 in FIG. 1. FIG. 3 is a perspective view of the heat dissipation assembly 400 in FIG. 2 from another viewing angle. FIG. 4 is an explode view of the heat sources 300 and the heat dissipation assembly 400 in FIG. 3.

In this embodiment, the heat dissipation assembly 400 is disposed in the accommodation space 150 of the housing 100, and includes a first fan 410, two first fin assemblies 420, a second fan 430, two second fin assemblies 440, a vapor chamber 450, a heat dissipation sheet 460 and two air guiding structures 470.

The first fan 410 has a first inlet 411 and two first outlets 412. The first inlet 411 is in fluid communication with the two first outlets 412. The first inlet 411 and the two first outlets 412 are located on different sides of the first fan 410, respectively. The two first fin assemblies 420 are located adjacent to the two first outlets 412, respectively.

In this embodiment, the second fan 430 includes a bottom plate 431, a peripheral side plate 432, a cover plate 433 and an impeller 434, and has a second inlet 435, two second outlets 436 and a side outlet 437. The peripheral side plate 432 stands on the bottom plate 431. The cover plate 433 is stacked on a side of the peripheral side plate 432 that is located farthest away from the bottom plate 431. The impeller 434 is rotatably disposed on the bottom plate 431. The second inlet 435 is located on the cover plate 433. The two second outlets 436 and a part of the side outlet 437 are located on different sides of the peripheral side plate 432, respectively. The two second outlets 436 and the side outlet 437 are in fluid communication with the second inlet 435. A direction A of the side outlet 437 directs toward the first fan 410. In other words, an outer surface 438 of the peripheral side plate 432 that has the side outlet 437 faces the first fan 410.

In addition, in this embodiment, the side outlet 437 is located at a position where the peripheral side plate 432 and the cover plate 433 are connected. However, the disclosure is not limited thereto. In other embodiments, the side outlet may be entirely located on the peripheral side plate while being spaced apart from the cover plate.

The two second fin assemblies 440 are located adjacent to the two second outlets 436, respectively.

Please refer to FIGS. 1 and 2. As shown in FIG. 1, the first inlet 411 and the second inlet 435 are in fluid communication with the outer inlets 1140 of the two opening parts 114 via the accommodation space 150, respectively. Moreover, as shown in FIG. 2, the first fan 410 are configured to blow heat dissipation airflows F1 and F2 flowing to the two first fin assemblies 420 via the two first outlets 412, respectively. The second fan 430 is configured to blow heat dissipation airflows F3 and F4 flowing to the two second fin assemblies 440 via the two second outlets 436, respectively. In other embodiments, the first fan may merely have one first outlet, and the second fan may merely have one second outlet. In such embodiments, the heat dissipation assembly may merely include one first fin assembly and one second fin assembly.

Please refer to FIGS. 2 to 4. The vapor chamber 450 is thermally coupled to the two first fin assemblies 420, the two second fin assemblies 440 and the two heat sources 300. In this embodiment, the heat dissipation assembly 400 may further include a heat pipe assembly 455. The vapor chamber 450 is thermally coupled to the two first fin assemblies 420 and the two second fin assemblies 440 via the heat pipe assembly 455. Note that the vapor chamber 450 has, for example, a chamber (not shown) with a wick structure (not shown) accommodated therein.

The heat dissipation sheet 460 is in thermal contact with a side of the vapor chamber 450 that is located farthest away from the heat source 300, and is located between the first fan 410 and the second fan 430. In this embodiment, the heat dissipation sheet 460 has a plurality of protrusions 461 located on a side thereof that is located farthest away from the vapor chamber 450. The protrusions 461 are in a cubic shape and are arranged in an array so as to increase the surface area and thus the heat transfer efficiency of the heat dissipation sheet 460.

In this embodiment, the heat dissipation assembly 400 may further include a mounting plate 465. The heat dissipation sheet 460 is fixed to the vapor chamber 450 via the mounting plate 465.

Figure 5:
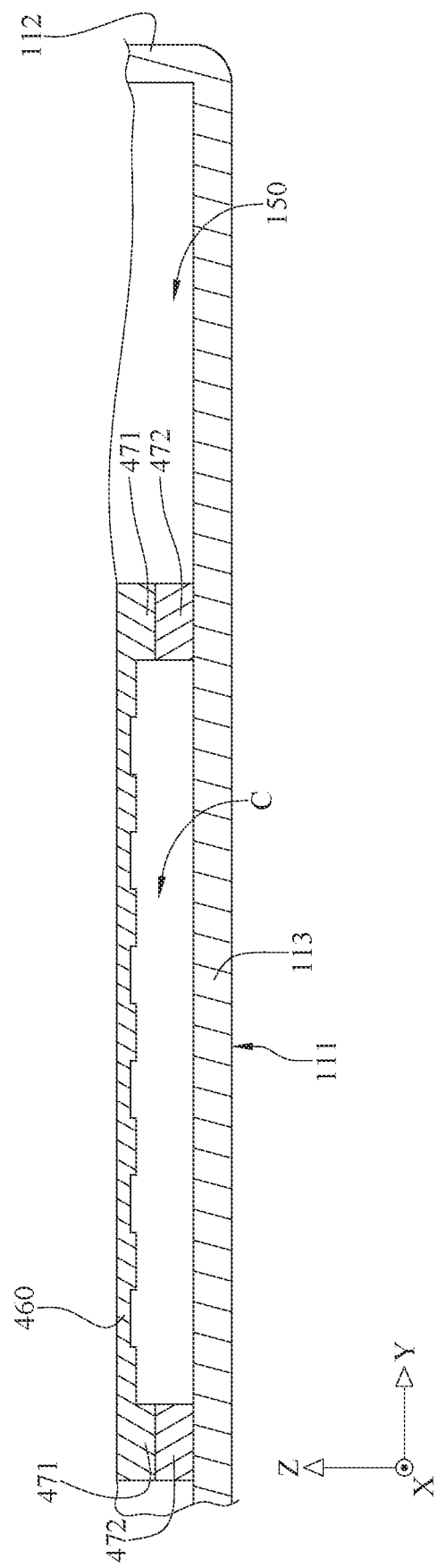
FIG. 5 is a cross-sectional view of the electronic device in FIG. 1 from another viewing angle.

Please refer to FIGS. 3-5. FIG. 5 is a cross-sectional view of the electronic device 10 in FIG. 1 from another viewing angle. Note that in order to clearly show the details of the disclosure, only the two air guiding structures 470, the heat dissipation sheet 460 and the bottom plate 111 are shown in FIG. 5. The two air guiding structures 470 are spaced apart from each other, and each include an air guiding bar 471 and an air guiding pad 472. In each air guiding structure 470, the air guiding bar 471 protrudes from a side of the heat dissipation sheet 460 that is located farthest away from the vapor chamber 450. The air guiding pad 472 is clamped between the air guiding bar 471 and the bottom plate 111. As shown in FIGS. 3 and 5, the two air guiding structures 470, the heat dissipation sheet 460 and the covering part 113 of the bottom plate 111 together form a heat dissipation channel C, and the side outlet 437 is in fluid communication with the heat dissipation channel C. As shown in FIG. 3, with the help of the two air guiding structures 470, a heat dissipation airflow F5 blown by the impeller 434 of the second fan 430 flows from the side outlet 437 to the heat dissipation channel C more efficiently, and thus is facilitated to flow to the heat dissipation sheet 460 thermally coupled to the vapor chamber 450. In addition, the air guiding bar 471 is made of a rigid material, and the air guiding pad 472 is made of a flexible material. Therefore, not only the heat dissipation airflow F5 is prevented from leaking out of the heat dissipation channel C by the rigid property of the air guiding bar 471, but also the tolerance between the air guiding structures 470 and the bottom plate 111 is compensated by the flexible property of the air guiding pad 472. The air guiding pad 472 is made of, for example, sponge.

In this embodiment, the two air guiding bars 471 and the heat dissipation sheet 460 are, for example, integrally formed as a single piece. Thus, the cost for manufacturing separate air guiding bars 471 is saved. In other embodiment, the two air guiding bars and the heat dissipation sheet may be components that are assembled after being manufactured separately.

In other embodiments, the air guiding structures may be entirely made of a rigid material or a flexible material. In addition, in other embodiments, the heat dissipation assembly may not include the air guiding structures.

According to the heat dissipation assembly and the electronic device disclosed by the above embodiments, the direction of the side outlet directs toward the first fan. Thus, the cold air blown by the second fan is effectively guided to the vapor chamber via the side outlet. In this way, even though there is no opening or hole on the housing for accommodating the heat dissipation assembly, the cold air is still allowed to be effectively guided to the vapor chamber. Accordingly, the heat dissipation assembly according to the disclosure is able to effectively cool the heat source by the vapor chamber without reducing the amount of the available I/O openings.

Further, according to the experimental results, comparing to the comparative example where there is no side outlet on the second fan and the heat dissipation assembly does not include the heat dissipation sheet, the temperature of the heat sources according to the disclosure is decreased by about 5° C. to 6° C., and the temperature of the base is decreased by about 3° C.

In addition, since the amount of the available I/O openings on the housing for accommodating the heat dissipation assembly is not reduced, the design freedom of the I/O openings is increased, thereby reducing the overall manufacturing cost of the electronic device including the heat dissipation assembly.

Moreover, since the heat dissipation assembly according to the disclosure effectively cools the heat source by the vapor chamber, the two fans (i.e., the first fan and the second fan) included in the heat dissipation assembly are able to effectively cool the heat sources. In this way, the heat dissipation assembly is not required to include more than two fans, thereby facilitating the maintenance of the heat dissipation assembly.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A heat dissipation assembly, comprising: a first fan, having a first inlet and at least one first outlet, wherein the first inlet and the at least one first outlet are in fluid communication with each other, and are located on different sides of the first fan, respectively; at least one first fin assembly, disposed adjacent to the at least one first outlet; a second fan, having a second inlet, at least one second outlet and a side outlet, wherein the at least one second outlet and the side outlet are in fluid communication with the second inlet, the second inlet, the at least one second outlet and the side outlet are located on different sides of the second fan, respectively, and a direction of the side outlet directs toward the first fan; at least one second fin assembly, disposed adjacent to the at least one second outlet; a vapor chamber, thermally coupled to the at least one first fin assembly and the at least one second fin assembly; and a heat dissipation sheet, in thermal contact with a side of the vapor chamber, and located between the first fan and the second fan; wherein the heat dissipation assembly further comprises two air guiding structures, wherein the two air guiding structures protrude from a side of the heat dissipation sheet that is located farthest away from the vapor chamber and are spaced apart from each other, the two air guiding structures together form a heat dissipation channel, and the side outlet is in fluid communication with the heat dissipation channel; wherein the two air guiding structures each have an air guiding bar and an air guiding pad, in each of the two air guiding structures, the air guiding bar protrudes from a side of the heat dissipation sheet that is located farthest away from the vapor chamber, the air guiding pad is stacked on a side of the air guiding bar that is located farthest away from the heat dissipation sheet, and the air guiding bar and the air guiding pad are made of a rigid material and a flexible material, respectively.

2. The heat dissipation assembly according to claim 1, wherein the two air guiding bars and the heat dissipation sheet are integrally formed as a single piece.

3. The heat dissipation assembly according to claim 1, wherein the heat dissipation sheet has a plurality of protrusions located on a side thereof that is located farthest away from the vapor chamber, and the plurality of protrusions are in a cubic shape and arranged in an array.

4. The heat dissipation assembly according to claim 1, wherein the second fan comprises a bottom plate, a peripheral side plate, a cover plate and an impeller, the peripheral side plate stands on the bottom plate, the cover plate is stacked on a side of the peripheral side plate that is located farthest away from the bottom plate, the impeller is rotatably disposed on the bottom plate, the second inlet is located on the cover plate, the at least one second outlet and a part of the side outlet are located on different sides of the peripheral side plate, respectively, and the side outlet is located on a position where the peripheral side plate and the cover plate are connected.

5. An electronic device, comprising: a housing; a motherboard, disposed in the housing; at least one heat source, disposed on the motherboard; and a heat dissipation assembly, disposed in the housing and comprising: a first fan, having a first inlet and at least one first outlet, wherein the first inlet and the at least one first outlet are in fluid communication with each other, and are located on different sides of the first fan, respectively; at least one first fin assembly, disposed adjacent to the at least one first outlet; a second fan, having a second inlet, at least one second outlet and a side outlet, wherein the at least one second outlet and the side outlet are in fluid communication with the second inlet, the second inlet, the at least one second outlet and the side outlet are located on different sides of the second fan, respectively, and a direction of the side outlet directs toward the first fan; at least one second fin assembly, disposed adjacent to the at least one second outlet; a vapor chamber, thermally coupled to the at least one first fin assembly, the at least one second fin assembly and the at least one heat source; and a heat dissipation sheet, in thermal contact with a side of the vapor chamber that is located farthest away from the at least one heat source, and located between the first fan and the second fan; wherein the housing comprises a base and a cover plate, the cover plate is stacked on a side of the base and forms an accommodation space together with the base, the motherboard and the heat dissipation assembly are located in the accommodation space, the heat dissipation assembly further comprises two air guiding structures, the two air guiding structures protrude from a side of the heat dissipation sheet that is located farthest away from the vapor chamber and are spaced apart from each other, the two air guiding structures are located between the heat dissipation sheet and the base, the two air guiding structures, the heat dissipation sheet and the base together form a heat dissipation channel, and the side outlet is in fluid communication with the heat dissipation channel; wherein the two air guiding structures each have an air guiding bar and an air guiding pad, in each of the two air guiding structures, the air quiding bar protrudes from a side of the heat dissipation sheet that is located farthest away from the vapor chamber, the air guiding pad is clamped between the air guiding bar and the base, and the air guiding bar and the air guiding pad are made of a rigid material and a flexible material, respectively.

6. The electronic device according to claim 5, wherein the base comprises a bottom plate and a side plate, the side plate stands on the bottom plate, the cover plate is stacked on a side of the side plate that is located farthest away from the bottom plate, the bottom plate, the side plate and the cover plate together form the accommodation space, the bottom plate comprises a covering part and two opening parts, the two opening parts are connected to two opposite sides of the covering part, respectively, the two opening parts each have a plurality of outer inlets, the first inlet and the second inlet are in fluid communication with the plurality of the outer inlets of the two opening parts via the accommodation space, respectively, and the covering part covers the accommodation space.

* * * * *